Aug. 5, 1969     C. A. GLENN     3,459,487
TEMPERATURE SENSITIVE DEVICES
Filed Feb. 2, 1966     2 Sheets-Sheet 1

INVENTOR.
CHARLES A. GLENN
BY *Fishman and Van Kirk*
ATTORNEYS.

Aug. 5, 1969 C. A. GLENN 3,459,487
TEMPERATURE SENSITIVE DEVICES
Filed Feb. 2, 1966 2 Sheets-Sheet 2
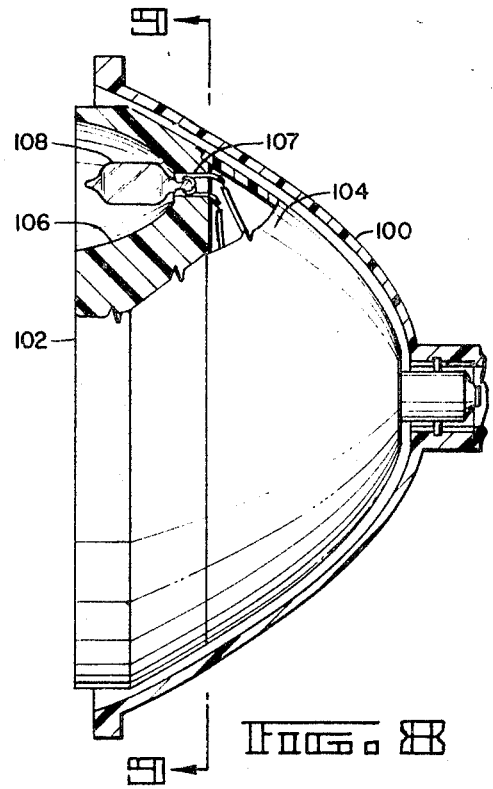
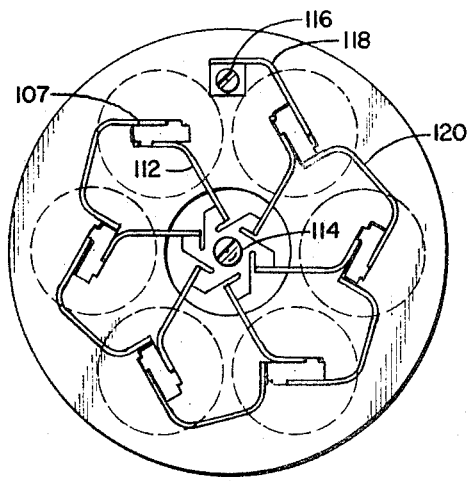
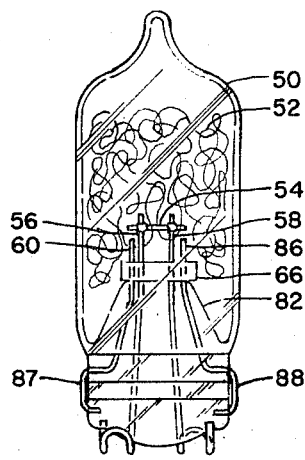
INVENTOR.
CHARLES A. GLENN
BY *Fishman and Van Kirk*
ATTORNEYS.

United States Patent Office 3,459,487
Patented Aug. 5, 1969

3,459,487
TEMPERATURE SENSITIVE DEVICES
Charles A. Glenn, 92 Four Mile Road,
West Hartford, Conn. 06107
Filed Feb. 2, 1966, Ser. No. 524,570
Int. Cl. F21k 5/02; G03b 15/02, 9/70
U.S. Cl. 431—95                                6 Claims

ABSTRACT OF THE DISCLOSURE

Temperature sensitive electrical switch devices particularly well suited for incorporation in photo flash lamps, the switches being normally open and employing elements which undergo a permanent physical change in response to temperatures in excess of normal environmental temperatures, the physical change causing closing of the switches to establish an electrical circuit. The elements which undergo physical change in response to elevated temperatures may be a body of low temperature insulating material which normally electrically isolates a pair of conductors and/or adjacently situated fusable conductors or heat shrinkable plastic members.

---

This invention relates to temperature sensitive electrical devices. More particularly, this invention is directed to the making and/or breaking of electrical contact between conductive elements in response to temperature. Accordingly, the general objects of this invention are to provide new and novel methods and apparatus of such character.

While not limited thtereto in its utility, this invention is particularly well suited to employment in an environment wherein pulses of thermal energy occur or are generated. An example of such an environment is a photoflash lamp. There are numerous applications for "single shot" devices which function in such a manner as to permanently open or close the contacts of an electrical switch in response to a thermal shock. The photoflash lamp, as will be explained in detail below, is but one of these applications. Of particular interest is an assembly of photoflash lamps in which the firing of each lamp in sequence results in the closing of contacts to provide a current path for the firing of another lamp in a predetermined sequence.

There are, of course, many devices available which operate in response to temperature to complete or open an electrical circuit between a current source and a load. As a general rule, these prior art devices are relatively expensive to fabricate, fragile and often difficult to adjust. The common thermostat type switch utilizing a bi-metallic strip is a device of the aforementioned character. Furthermore, thermostat type switches and other similar devices cannot, without the incorporation of relatively bulky and complex mechanical or electro-mechanical latching or holding means, function in such a manner as to permanently open or close two or more contacts.

The present invention overcomes the aforementioned and other disadvantages and deficiencies of prior art temperature sensitive electrical switch devices by providing a highly reliable "single shot" electrical switch characterized by simplicity of construction and minimization of the number of moving parts.

It is therefore an object of this invention to provide a temperature sensitive electrical device.

It is another object of this invention to permanenly make or break contact between conductive elements in response to temperature.

It is yet another object of this invention to provide a temperature sensitive electrical switch means which permanently makes or breaks contact between conductive elements and which is less complex and more reliable than prior art devices of such character.

It is a further object of this invention to provide a temperature sensitive electrical device which is less expensive and easier to fabricate than prior art devices capable of permanently making or breaking contact between electrically conductive elements.

It is also an object of this invention to provide a photoflash lamp having a temperature sensitive electrical switch means built therein.

It is still another object of this invention to provide a photoflash lamp having means incorporated therein for permanently making contact between a pair of conductive elements in response to the firing of the lamp.

It is yet another object of this invention to provide a photoflash assembly for illuminating subject comprising a plurality of photoflash lamps which will fire individually and in a predetermined sequence without any motion of or between the lamps.

The foregoing and other objects and advantages of this invention are accomplished through employment of a member or element which undergoes a permanent physical change in response to its being subjected to a thermal pulse or temperature extreme. The heat responsive member or element is positioned so as to permanently establish or interrupt the current path between at least a pair of conductive elements when it undergoes the temperature induced physical change.

This invention may be better understood and its numerous advantages will become apparent to those skilled in the art by reference to the accompanying drawing wherein like reference numerals refer to like elements in the various figures and in which:

FIGURE 6 is a front elevational view of a fifth embodiment of a photoflash lamp having temperature sensitive electrical switch means therein in accordance with the teachings of this invention.

FIGURE 8 is a partial cross-sectional side view of a first embodiment of apparatus for supporting and interconnecting a plurality of photoflash lamps of the present design.

FIGURE 9 is a cross-sectional rear view of the apparatus of FIGURE 8 taken along line 9—9 of FIGURE 8.

Figure 1:
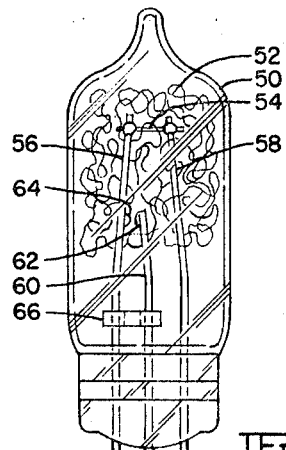
FIGURE 1 is a front elevational view of a first embodiment of a photoflash lamp having temperature sensitive electrical switch means therein in accordance with the teachings of this invention.

Referring now to FIGURE 1, a baseless, all-glass photographic flash lamp incorporating a temperature responsive switch means is shown. This flash lamp, which is of the instantaneous combustion type, comprises a light pervious envelope of glass or similar material 50 which contains a charge of light-generative combustible material 52. Material 52 may, for example, be filamentary or foil aluminum or magnesium in a suitable atmosphere, such as oxygen, capable of supporting combustion thereof. The charge of combustible material 52 has, closely associated therewith, an electrically-activated igniter element which comprises a short fuseable element 54 supported upon heavier wires 56 and 58. Wires 56 and 58 pass out of envelope 50 through the base thereof. Also passing through the base of envelope 50 is a third wire electrode 60. A contact 62 is formed on the end of wire 60 which extends into envelope 50. A second contact 64 is suitably attached, as by soldering, to wire 56 at a point along its length opposite to contact 62. A heat shrinkable plastic ring 66 is positioned about wires 56 and 60 such that these wires fit into the slots in the inner diameter of the plastic ring. The wires thus support the plastic ring while, at the same time, the plastic ring keeps contacts 62 and 64 initially separated.

When the firing switch located in a camera, not shown, is momentarily closed, current will flow from the batteries in the flash holder through the igniter 54 in the flash lamp via wires 56 and 58. In the manner well known in the art, the instantaneous current pulse produced by the closing of the shutter activated firing switch will cause destruction of igniter 54 and combustion of charge 52 within envelope 50 with an accompanying bright flash of light. The heat generated by the combustion of charge 52 is of sufficient intensity and duration to cause the plastic ring to "remember" its original size and to shrink thereto. This shrinkage will urge wires 56 and 60 toward one another thus closing contacts 62 and 64. As will be explained in detail below in the course of the discussion of FIGURE 7, permanent closing of contacts 62 and 64 will provide a conductive path through the lamp to "arm" a second properly connected flash lamp such that a plurality of lamps may be individually fired in predetermined sequence with each succeeding momentary closing of the shutter activated firing switch in the camera.

Since the contacts which are to be closed in the embodiment of FIGURE 1 (and the embodiments of FIGURES 2–6) are located in an oxidizing atmosphere, it may be necessary to provide oxidation protection therefor. That is, it may be desirable, to insure that a poorly conductive or nonconductive oxide does not form on the contacts or contact portions of the electrodes, such oxide preventing completion of the circuit, to provide a coating of gold or other non-oxidizable conductive material on the contacts and/or electrodes.

Figure 2:
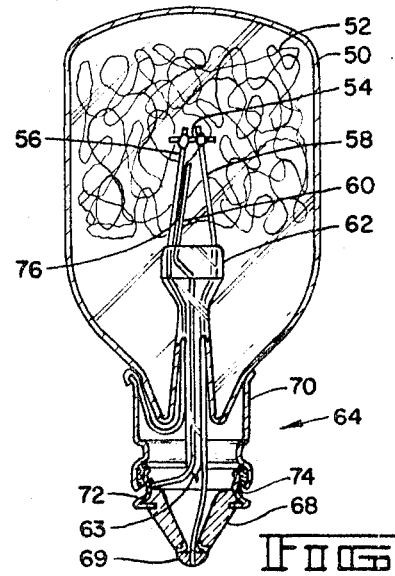
FIGURE 2 is a front elevational view of a second embodiment of a photoflash lamp having temperature sensitive electrical switch means therein in accordance with the teachings of this invention.

FIGURE 2 shows a second embodiment of a flash lamp incorporating means which, upon firing of the lamp, will establish a conductive path therethrough to another series connected, similar lamp. In the embodiment of FIGURE 2, however, the heat shrinkable member of the embodiment of FIGURE 1 has been eliminated. The flash lamp of FIGURE 8 comprises a light pervious envelope 50 of somewhat different shape than that shown in embodiment of FIGURE 1. Disposed within envelope 50 is a charge of light-generative, combustible material 52, an igniter element 54 and a pair of support wires or electrodes 56 and 58 for the igniter. Electrodes 56 and 58, as well as intermediately disposed electrode 60, pass into envelope 50 through a boss 62 which is integral therewith. Boss 62 supports the electrodes in the proper position relative to one another. Also passing through boss 62 is an evacuation tube 63 through which envelope 50 is evacuated and the charge of oxygen is inserted.

Envelope 50 is affixed to and supported by base member indicated generally at 64. Base 64 contains a contact button 69 at the end thereof. Contact 69 is electrically connected, as by soldering, to the end of electrode 58 and is insulated from the remainder of the base by a member 68 which may be glass or other nonconductive material. The other igniter support electrode 56 makes electrical contact with a conductive member 70 which forms the outer surface of the upper portion of base 64. The remaining electrode 60 is brought out through boss 62 to a contact member 72 which is disposed about the outer diameter of the socket 64 between contacts 69 and 70. Contact 72 is insulated from contact 70 by a ring of insulating material 74. When the lamp of FIGURE 2 is inserted in a suitably designed receptacle of a multiple bulb flash lamp assembly, contact 69 will be connected to a first terminal of a current source, contact 70 will be connected to either a second terminal of the current source through a firing switch or to contact 72 of another lamp (which will be fired previously) and contact 72 will be connected to the next contact 70 on the succeeding lamp to be fired. As will be observed, part of electrode 60 is shaped and positioned so as to be located close to and oriented parallel with a portion of electrode 56. Oxidation protection for electrodes 56 and 60, if desired, is provided by a layer of welding flux 76. Flux 76 may be painted on and between the electrodes during the assembly process and will coat at least that part of electrodes 56 and 60 which lie parallel to each other.

Upon combustion of the charge 52, sufficient heat will be generated to melt flux 76. Simultaneously, the upper ends of electrodes 56 and 60 will be melted (undergo a permanent physical change) and the molten material will flow along the electrodes. As the heat generated by the flash (combustion of charge 52) is dissipated by conduction to the environment surrounding the lamp, the molten portions of electrodes 56 and 60 will fuse and, accordingly, the electrodes will be welded together. The welding together of the lower portions of electrodes 56 and 60 resulting from the melting of the upper portions thereof short circuits contacts 70 and 72 and establishes a current path through the lamp to a succeeding series connected lamp via contact 70, electrodes 56 and 60 and contact 72. Thus, the melting of the upper portion of electrodes 56 and 60 completes a circuit between the lower portions thereof.

Figure 3:
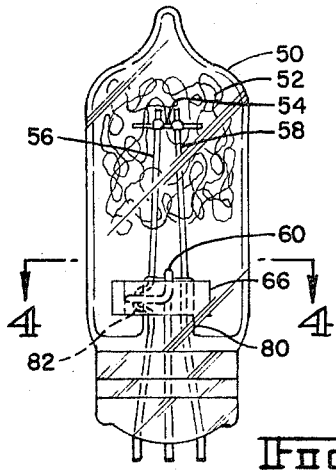
FIGURE 3 is a front elevational view of a third embodiment of a photoflash lamp having temperature sensitive electrical switch means therein in accordance with the teachings of this invention.
Figure 4:
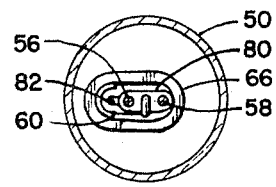
FIGURE 4 is a cross-sectional, top view of the apparatus of FIGURE 3 along line 4—4 of FIGURE 3.

Referring now to FIGURES 3 and 4, a third embodiment of a flash lamp in accordance with the teachings of this invention is disclosed. The device of FIGURES 3 and 4 is similar to that of FIGURE 1 in that it employs a ring 66 of heat shrinkable plastic to cause the permanent establishment of electrical contact between electrodes 56 and 60 upon firing of the lamp. However, in the embodiment of FIGURES 3 and 4, the construction is such that the electrodes are caused to contact each other directly thus eliminating the need for separate contact elements. In order to accomplish the foregoing, electrodes 56, 58 and 60 pass into the interior of envelope 50 via a boss 80 which is integral with envelope 50. Electrode 56 is formed with a bend therein which extends out through the side of boss 80. The bent portion of electrode 56 thus forms a first contact surface 82. Electrode 60 extends out through the upper end of boss 80 and is then, as may most clearly be seen from a consideration of FIGURES 3 and 4 together, folded down and outwardly so as to at least partially encircle the boss and contact surface 82. The heat shrinkable plastic ring 66 contacts, at opposite sides of its inner circumference, boss 80 and the folded over portion of electrode 60. Thus, as may best be seen from FIGURE 4, boss 80 and electrode 60 support ring 66. In order to insure proper positioning of ring 66, the ring may be notched so as to accept the bent over portion of electrode 60 and/or boss 80 may be formed so as to present a shoulder or shoulders upon which the bottom of ring 66 will be at least partially supported. Electrode 60 will be spring loaded against ring 66 and thus the chance of accidental contact between electrode 60 and contact portion 82 of electrode 56 is virtually eliminated.

Figure 7:
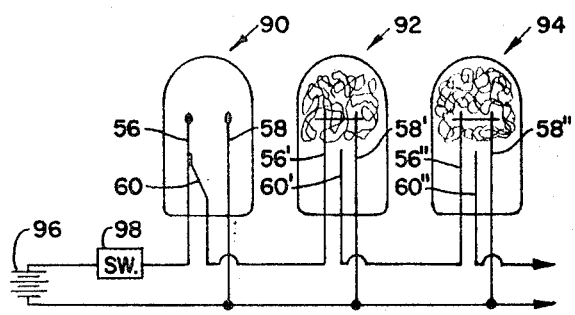
FIGURE 7 is a schematic showing of the electrical interconnection between a plurality of photoflash lamps of the present design.

Upon ignition, ring 66 will shrink and will thus urge the bent over portion of electrode 60 inwardly and against contact portion 82 of electrode 56. The thus established permanent electrical contact between electrodes 56 and 60 will, in the manner to be described below in the explanation of FIGURE 7, provide a conducting path through the lamp to arm another similar series connected bulb.

Figure 5:
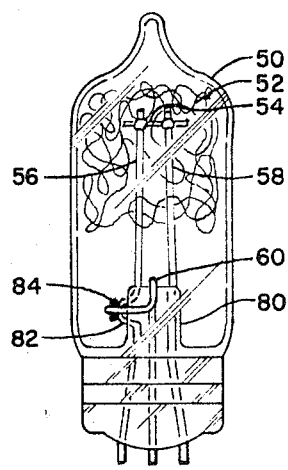
FIGURE 5 is a front elevational view of a fourth embodiment of a photoflash lamp having temperature sensitive electrical switch means therein in accordance with the teachings of this invention.

The flash bulb of FIGURE 5 is similar to that of FIGURES 3 and 4 with one notable exception. In the embodiment of FIGURE 5, the heat shrinkable plastic ring has been eliminated. The bent over portion of electrode 60 is, in the embodiment of FIGURE 5, formed so as to be spring loaded in the opposite direction to that previously described. That is, in the embodiment of FIGURES 3 and 4, the bent over portion of electrode 60 had a natural tendency to move outwardly away from contact portion 82 of electrode 56. In the embodiment of FIGURE 5, the bent over portion of electrode 60 has a natural tendency to move inwardly toward contact portion 82. Premature contact between contact portion 82 and electrode 60 is prevented by a drop or coating of low melting point, nonconductive material 84 which is disposed therebetween. Material 84 may, for example, be wax or any other low melting point nonconductive material. A suitable wax is Esso Wax Grade 5010 available from the Humble Oil and Refining Company.

Upon ignition of charge 52, sufficient heat will be generated to melt material 84. The melted material will flow out from between the electrodes and electrode 60 will thus be able to move into contact with contact portion 82 of electrode 56. It should be noted that material 84 may also be employed in the embodiments of FIGURES 1, 2 and 3 to provide oxidation protection.

In order to facilitate usage thereof, it may be desirable to construct the photoflash lamps of this invention in such a manner that a user does not have to pay attention to orientation when inserting the lamps into a socket. In FIGURE 6, a miniature lamp is shown which operates on the same principle as the lamp shown in the embodiment of FIGURE 1 but which has no orientation requirements. The photoflash lamp of FIGURE 6 employs the usual third electrode 60 and a fourth electrode 86. Electrodes 60 and 86 are located to the outside of the igniter support wires (electrodes 56 and 58) and are brought out through boss 82. The outer ends of electrodes 60 and 86 are formed into contacts 87 and 88 which are disposed at opposite ends of the base of the lamp.

Upon firing of the lamp of FIGURE 6, the heat sensitive member, in this case heat shrinkable plastic ring 66, will cause electrodes 60 and 86 to be urged toward one another until they respectively make contact with electrodes 56 and 58. Thus, if the socket for the lamp is designed with a contact member for the third electrode at one end thereof, firing of the lamp will complete a circuit between one of the primary electrodes 56 or 58 and the end contact. The end contact will thus be connected to one of electrodes 56 or 58 in a succeeding lamp in an array regardless of which way the lamp is plugged into the socket.

It is to be understood that the electrode arrangement of FIGURE 6 is equally applicable to the embodiments of FIGURES 2 and 5. That is, while the embodiment of FIGURE 6 has been shown employing a heat shrinkable plastic member, the electrodes could be welded together in the manner of the embodiment of FIGURE 2 or they could be spring loaded and separated by a low melting point nonconductive material as in the embodiment of FIGURE 5.

FIGURE 7 is a schematic diagram of how a plurality of flash bulbs of the type shown in either of FIGURES 1, 2, 3, 5, or 6 could be electrically interconnected to provide a flash lamp array wherein each triggering of the shutter in a camera associated therewith will cause ignition of a separate lamp. In FIGURE 6 the first of three series connected flash lamps 90, 92 and 94 has been fired thereby permanently establishing an electrical connection between electrodes 56 and 60 therein. The firing of lamp 90 has established a current path between a current source 96 and electrode 56' of bulb 92, through the closing of switch 98, via electrodes 56 and 60 of lamp 90. Electrodes 58, 58' and 58", respectively of lamps 90, 92 and 94, are connected to the other terminal of current source 96. Switch 98 will typically be a "fly-by" type switch, of the type commonly employed in the shutter mechanism of cameras, which will effect momentary closure of the lamp firing circuit at the instant of shutter opening, whereby the camera film will be exposed to the lamp generated light reflected from the object to be photographed.

As should now be obvious, the firing of lamp 90, by the first momentary closing of switch 98, has armed lamp 92 so that a second closing of switch 98 will cause firing of lamp 92 and thus arm lamp 94 for firing upon another closing of switch 98. Thus, a flash lamp array has been provided wherein a series of photographs may be taken with flash lamp illumination in a rapid sequence, the necessity for the changing of flash lamps after the taking of each picture having been obviated. Further, by empolying the flash lamps of this invention interconnected in the manner taught by FIGURE 7, a series of photographs may be taken with the aid of flash lamp illumination in rapid sequence by apparatus which is uncomplicated in a mechanical sense and accordingly highly reliable. That is, employment of the flash lamps of this invention eliminates the necessity for use of relatively complex mechanical devices for moving a new lamp into position after each triggering of the shutter activated firing switch 98. Accordingly, use of the lamps of this invention in the manner taught by FIGURE 7 will permit the rapid taking of a series of "flash" photographs with cameras which do not have sophisticated mechanical feeding devices built therein or incorporated in associated flash lamp holders.

In the case of the embodiments of this invention which take the form of photoflash lamps, as is shown in FIGURES 1–6, the maximum efficiency of utilization occurs when such lamps are used in groups. Further, some form of reflector means must be associated with the lamps in order to adequately illuminate the subject to be photographed. While it would be possible to affix or otherwise dispose a plurality of photoflash lamps of the present design about a single reflector, the preferred arrangement is to provide a separate reflector for each individual lamp. While an individual reflector may be built in or associated with each lamp, cost to the user may be minimized by designing an adapter with reflective portions for each of a plurality of lamps. The latter approach, of course, permits the reflector portions to be reused and thus minimizes the cost of the lamps themselves. Such an adapter is shown in FIGURES 8 and 9.

In FIGURE 8, the adapter is shown as being fitted into a standard prior art flash lamp assembly 100. The adapter comprises two sections, 102 and 104. Section 102 has a plurality of elliptically shaped cavities 106 therein. Section 102 has, at the base of each of cavities 106, sockets 107 for receiving lamps 108. Sockets 107 have, when lamps such as that shown in the embodiment of FIGURE 6 are employed, means at the sides thereof adapted to make electrical contact with the two pin type electrodes which extend from the base of the flash lamp and means at the end thereof for making contact with the electrode means extending from the end of the base of the photoflash lamp. As will be explained in greater detail below in the discussion of FIGURE 9, the various contact means in each of sockets 107 are suitably interconnected so as to enable the photoflash lamps to be fired sequentially. The inner end of adapter section 104 is preferably designed for insertion into the socket in the base of holder 100 (a bayonet type connection being the most common) such that the adapter will be held securely in the holder and the current source initially used with holder 100 may be utilized.

As may be seen from FIGURE 9, a first side contact in each of the sockets 107 is connected via conductors 112 to a center terminal 114. As indicated above, terminal 114 is connected to the firing current source by means, not shown through the socket in the base of holder 100. The second connection to the current source is made via terminal 116. A conductor 118 electrically connects terminal 116 to the second side contact of the socket which will receive the lamp to be first fired. The third (end) contact of this socket will be electrically connected, via conductor 120, to the second terminal of the socket which will receive the next succeeding lamp to be fired. The connection to each succeeding lamp will be as above described. Considering FIGURES 7 and 9 together, conductor 118 of the embodiment of the embodiment of FIGURE 9 will be electrically connected to electrode 56 of lamp 90 and conductor 120 of the FIGURE 9 embodiment will connect electrode 60 of lamp 90 to electrode 56' of lamp 92.

As should now be obvious, a photoflash lamp array employing a plurality of lamps which may be individually fired in a predetermined sequence and in rapid fashion has been invented. This invention achieves this desirable rapid firing while obviating the necessity for motion of or between the individual photoflash lamps. Obviously, any desired number of lamps or other devices may be arranged about a single adapter in accordance with the teachings of this invention.

While much emphasis has been placed on the application of this invention to the field of photoflash photography, innumerable other applications for the temperature sensitive electrical switch devices of this invention will be apparent to those skilled in the art.

It should also be obvious that this invention may be employed to cause a plurality of lamps, other light sources, ordinance devices, heating elements, etc. to be activated in a predetermined sequence and that, by holding the firing switch in the closed position, a series of devices could be activated one after the other in a predetermined sequence and with a predetermined time lag between each firing. The time lag can be controlled by careful choice of the mass and composition of the temperature sensitive element employed in the devices.

While preferred embodiments have been shown and described, various modifications and substitutions may be made without departing from the spirit and scope of this invention. Accordingly, it is to be understood that this invention has been described by way of illustration and not limitation.

What is claimed is:
1. A flash lamp comprising:
a light pervious, hermetically sealed envelope;
a charge of combustible material disposed in said envelope;
an igniter element;
first and second electrode means for supporting said igniter element in said envelope in proximity to said charge;
third electrode means in said envelope, said third electrode means being initially electrically isolated from said first and second electrode means and being biased toward at least a portion of said first electrode means; and
a body of nonconductive material disposed between said first and third electrode means, said body of material having a melting point above the usual environmental temperature of the lamp, the heat generated during combustion of said charge being sufficient to melt said body of material, melting of said body of material permitting electrical contact to be established between said first and third electrode means.

2. The apparatus of claim 1 wherein said third electrode means comprises:
a conductive member which is spring loaded toward said portion of said first electrode means, said motion being prevented by said body of material prior to ignition of said charge.

3. A flash lamp comprising:
a light pervious, hermetically sealed envelope;
a charge of combustible material disposed within said envelope;
an igniter element;
first electrode means for partly supporting said igniter element within said envelope in proximity to said charge, said first electrode means being at least partly comprised of a fusible material and extending out of said envelope;
second electrode means for partly supporting said igniter element with said envelope in proximity to said charge, said second electrode means extending out of said envelope; and
third electrode means passing into said envelope, said third electrode means being positioned in said envelope adjacent and at least partly parallel to said fusible part of said first electrode means, the heat generated during combustion of said charge being sufficient to melt at least said fusible portion of said first electrode means, said melted electrode material fusing with at least part of said third electrode means to bond said third electrode means to said first electrode means thereby permanently establishing electrical contact between said first and third electrode means.

4. An array of temperature sensitive electrical devices comprising:
first and second electrical devices each having at least three electrodes and having included therein temperature sensitive electrical switch means, said devices each including:
a light pervious, hermetically sealed envelope;
a charge of combustible material disposed in said envelope;
an igniter element;
first and second electrode means for supporting said igniter element within said envelope in proximity to said charge, said electrode means extending out of said envelope;
a third electrode passing into said envelope, said third electrode means being initially electrically isolated from said first and second electrode means; and
temperature responsive means located adjacent to said electrode means for establishing an electrical connection between said first and third electrode means, said temperature responsive means undergoing a permanent physical change in response to the heat generated during combustion of said charge, said temperature induced physical change of said temperature responsive means causing said first and third electrode means to cooperate to establish a current path therethrough;
a current source having at least first and second opposite polarity terminals;
means for electrically connecting the second of said electrodes of each of said devices to the first terminals of said current source;
means for electrically connecting the first electrode of the first of said devices to the second terminal of said source; and means for electrically connecting the third electrode of said first device to the first electrode of said second of said devices.

5. The apparatus of claim 4 further comprising:

reflector means positioned adjacent said envelopes of said devices for reflecting the light generated during combustion of said charge in a desired direction.

6. The apparatus of claim 5 wherein said reflector means comprises:

an individual reflector positioned adjacent each of said envelopes.

References Cited

UNITED STATES PATENTS

| 2,290,309 | 7/1942 | Aquilla | 67—31 |
| 3,127,760 | 4/1964 | Kirkpatrick et al. | 200—143 |
| 3,294,941 | 12/1966 | Mullen | 174—110 |

FOREIGN PATENTS 1,192,047  4/1965  Germany.

JAMES W. WESTHAVER, Primary Examiner

U.S. Cl. X.R.

95—11; 240—1